United States Patent Office 3,534,119
Patented Oct. 13, 1970

3,534,119
CROSSLINKING EPDM RUBBER WITH DIMETHYLOL PHENOL
Douglas I. Relyea, Pompton Plains, N.J., assignor to Uniroyal, Inc., New York, N.Y., a corporation of New Jersey
No Drawing. Filed Apr. 11, 1967, Ser. No. 629,904
Int. Cl. C08f 41/10, 29/10
U.S. Cl. 260—848                11 Claims

ABSTRACT OF THE DISCLOSURE

Acceleration of the cure of EPDM rubber with a dimethylol phenol curative, such as an alkylated phenol-formaldehyde resin, is achieved with a synergistic combination of a metal salt, such as stannous chloride, and certain organic halides, such as 1,2-dibromo-1,2-diphenylethane.

BACKGROUND OF THE INVENTION

Field of the invention

This invention relates to a vulcanizable composition of EPDM rubber, a method of vulcanizing said rubber, and a vulcanizate obtained by such a method.

Description of the prior art

The use of metal salts to promote the phenolic resin cure of butyl rubber is known; see, for example, U.S. Pat. 2,726,224, Peterson and Batts, Dec. 6, 1955. It is also known that the cure can be accelerated by chlorinated paraffin wax, and that the action of such accelerator can be enhanced by a metal oxide or salt (U.S. Pat. 2,727,874, Peterson and Batts, Dec. 20, 1955). Chlorosulfonated polyethylene, neoprene, chlorinated butyl rubber, and brominated butyl rubber are also known to have an accelerating effect on the phenolic resin cure of butyl rubber, especially in the presence of zinc oxide (2,734,039; 2,734,877; 2,749,323; 3,007,889). Accelerators and combinations of accelerators carried on molecular sieves are disclosed in 3,036,986, O'Connor and Thomas, May 29, 1962; the accelerating substances include such halogenated organic compounds as 1,4-dichlorobutene, benzoyl chloride, alpha, alpha, alpha-trichlorotoluene, and trifluoroacetic acid. Also, Belgian Pat. 632,223 to Chemische Werke Albert discloses compounds of the type

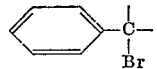

in conjunction with metallic halides as accelerators.

However, it has been desired to provide even more rapid or more effective cure than is ordinarily feasible by following the teachings of such prior art.

SUMMARY OF THE INVENTION

The invention is based on the surprising discovery that there is a synergistic cooperation between (A) a metal salt and (B) certain organic halogen compounds as herein defined, whereby the phenolic resin cure of EPDM rubber is rendered remarkably more effective by the combined use of the two materials (A) and (B) in such a cure. The products have excellent aging characteristics.

The invention may be viewed as promotion of the phenolic resin cure of EPDM rubber by the use of a synergistic combination of a metal salt and a new cocatalyst. The cocatalyst is chosen from the group consisting of:

(1) alpha-haloalkyl arenes in which the alkyl portion contains at least two carbon atoms, and alpha-halocycloalkyl arenes;
(2) beta-haloalkyl arenes
(3) 1,1-dihaloalkanes
(4) 1,2-dihaloalkanes
(5) halohydrins
(6) alpha-haloalkyl ethers
(7) beta-haloalkyl ethers
(8) beta-haloalkyl thioethers
(9) alpha-haloalkyl thioethers
(10) alpha-haloalkanoic acids, and esters and salts thereof.

Compounds belonging to two or more of these categories are also useful cocatalysts. As examples of these mixed compounds, one may cite

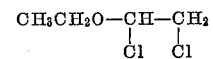

an alpha-haloalkylether, beta-haloalkylether

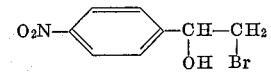

a beta-haloalkyl arene and halohydrin

DESCRIPTION OF THE PREFERRED EMBODIMENTS

The phenolic resin curatives employed in the invention may be described as dimethylol phenols, especially as resinous condensation products of 2,6-dimethylol-4-hydrocarbylphenols, as disclosed for example in Tawney and Little 2,701,895. Usually the hydrocarbyl group has from 1 to 20 carbon atoms, and may be alkyl (preferably lower alkyl, i.e. 8 carbon atoms or less, more preferably 3 to 8 carbon atoms, e.g. tertiary-butyl and tertiary-octyl), cycloalkyl (e.g. cyclohexyl), aryl (e.g. phenyl), aralkyl (e.g. benzyl, cumyl). There may also be used halogenated forms of such materials; that is, especially halomethyl methylol phenols, including the resitols thereof, as described in U.S. Pat. 2,972,600, Braidwood, Feb. 21, 1961 or British Pat. 857,428, Esso Research and Engineering Co., May 30, 1958. Preferred halogenated curatives may be represented, in their monomeric form, by the structural formula:

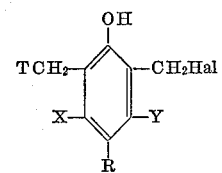

wherein Hal stands for halogen, especially bromine (preferred) or chlorine, T stands for an hydroxyl group or Hal as previously defined, X stands for hydrogen or hydrocarbyl (e.g., alkyl, aryl, aralkyl, having up to 16 carbon atoms), Y stands for hydrogen, hydroxy or hydrocarbyl as previously defined (especially alkyl having 1 to 8 carbon atoms), and R stands for a monovalent substituent such as a hydrocarbyl group as previously defined or a halogen (e.g. chlorine). Some examples are 2-bromomethyl - 6 - hydroxymethyl-4-tert-butylphenol, 2-chloromethyl- 6 - hydroxymethyl - 4 - diisobutylphenol, and 2,6-di(bromomethyl)-4-phenylphenol.

Preferred curatives for use in the invention are multicyclic phenols, that is, dimers, trimers and higher polymers, containing multiple units of the foregoing kind, which may be represented by the formula:

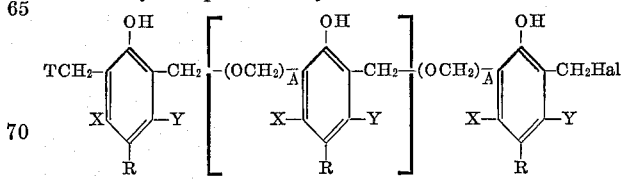

wherein Hal, T, X, Y, and R are as previously defined, A has a value of 0 or 1 and $n$ has a value of 0 or averages 1 or 2 or higher (up to for example 5 or 6 or even higher).

A highly preferred class of multicyclic phenols of the foregoing kind are represented by those in which T is OH or bromine, Hal is bromine, X and Y are hydrogen, R is an alkyl group having 4 to 16 carbon atoms, A is 1 and $n$ is not more than 2. Such multicyclic phenols are described in more detail by Braidwood, above cited, and the disclosure of Braidwood is therefore hereby incorporated herein by reference, as describing the preferred class of curatives. Such bromomethyl phenols as prepared commonly contain quantities of non-halogenated phenols; preferred preparations are those containing from 1% to 9% bromine, more preferably 4% to 5% bromine. The compositions as commonly prepared are also believed to include material in which A is 0; that is, not all of the phenolic nuclei are joined by ether linkages. Both resols and resitols fall into this preferred category, as is explained by Braidwood.

Other preferred curatives used in the invention are those in which X and Y are hydrogen, A is 0, $n$ is 0 or 1, Hal is chlorine, T is chlorine and R is chlorine; when $n$ is 0 the curative is the dimer; 2,2′-methylenebis(4-chloro-6-chloromethylphenol).

Still other preferred curatives are those in which X and Y are hydrogen, A is 0, $n$ is 0 or 1, Hal is chlorine, T is chlorine, and R is a lower alkyl (especially an alkyl group having from 2 to 6 carbon atoms). Thus, a particularly perferred chemical of this kind, wherein $n$ is 1, is the trimer 2,6 - bis(2 - hydroxy-3-chloromethyl-5-tert-butylbenzyl)-4-tert-butyl phenol.

In the invention, the described halogen-free or halogenated dimethylolphenols are employed to cure or vulcanize the type of synthetic rubber known as EPDM rubber, which may be described as a rubbery copolymer of at least two different monoolefins (usually ethylene and propylene, although other alpha-olefins such as butene-1 or pentene-1 may be used) with at least one copolymerizable polyene, usually a diene, whether an open chain non-conjugated diene such as 1,4-hexadiene, or a cyclic diene such as dicyclopentadiene, cyclooctadiene, methylene norbornene, ethylidene norbornene, or mixtures thereof. The EPDM rubber usually contains ethylene and propylene in weight ratio of from 20:80 to 75:25 by weight, and theamount of diene ordinarily ranges from about 1 to 25% (preferably 2 to 15%) by weight of the terpolymer. Rubber of this type are described for example in U.S. Pat. 2,933,480; 3,000,866; 3,063,973; 3,093,-620; 3,093,621 and 3,136,739.

The dimethylolphenol resin cure of the EPDM rubber is accelerated in the process of the invention with a metal salt and organic halogenated compound of the kind defined herein. The metal salts employed for this purpose may be described as heavy metal halides, in which category I include aluminum halides. Among these may be mentioned stannous or stannic chloride, zinc chloride, iron chloride, aluminum chloride, chromium chloride, and the like. Although the chlorides are preferred, other halides such as aluminum bromide or stannic iodide may be used.

Considering now in more detail the other accelerator or cocatalyst employed along with the metal salt in the synergistic combination of the invention, examples of these taken from the various useful categories are as follows: alpha-haloalkylarenes: 1,2-dibromo-1,2-diphenylethane, 1,4-dibromotetralin (1,4-dibromo-1,2,3,4-tetrahydronaphthalene), 1,3-dibromoindane; beta-haloalkylarenes: 2-bromoethyl benzene, 2-chloroethyl benzene, 2-bromoindanone; 1,1-dihalides: 1,2-dibromo-1,1-dichloroethane, 1,1 - dichloro-3,3-dimethylbutane, 2,2 - dibromopropane; 1,2-dihalides: alpha, beta-dibromohydrocinnamamide, 1,2,4,5-tetrabromo - 1,5-diphenylpentanone-3, 1-p-anisyl - 1,2 - dibromoethane, 1,2 - dibromo - 3 - chloropropane, 1,2,3,4-tetrabromo-1,2,3,4-tetrahydronapthalene, alpha, beta-dibromoethylbenzene, 3,4 - dibromo - tetrahydrothiophene 1,1 - dioxide, 1,2 - dibromo - 1 - phenyl butanone - 3, 2,3-dibromo - propionitrile, 1,2-dibromo-1,5 - diphenyl 4-pentenone-3; halohydrins: alpha-bromomethyl - 4 - nitrobenzyl alcohol, alpha - bromomethyl benzyl alcohol, alpha - bromomethyl - 4 - methoxybenzyl alcohol, 1 - chloro - 2 - propanol, 2-bromo-1-indanol, 1,3-dichloro - 2 - propanol, alpha - haloethers: e.g., 1,2-dichloroethyl ethel ether, 1 - chloroheptyl ethyl ether, 1-chloroethyl cyclohexyl ether, 2,3-dichlorodioxane; betahaloethers: 1,2 - dichloroethyl ethyl ether, 2 - bromoethyl phenyl ether, 2 - chloroethyl phenyl ether, epichlorohydrin, 2 - chloroethyl benzyl ether; alpha-halothioethers: 1 - chlorocyclohexyl phenyl sulfide, 1 - chlorocyclohexyl butyl sulfide, 1 - chloro-1-methylethyl phenyl sulfide; beta - halothioethers: o-chlorobenzyl 2 - chloroethyl sulfide, 2,3,5,6 - tetrakis(2 - chloroethylthio) - hydroquinone, 2,3-dihydro - 5,7,8-tris(2-chloroethylthio) - 6 - hydroxy-1,4-benzoxathiin; alpha - haloacids and derivatives: 2,3-dichlorosuccinic acid, ethyl 2 - bromopropionate, ethyl 3-bromopropionate alpha, beta - dibromo - beta - phenylpropionic acid, 2,3 - dibromosuccinic acid.

The amount of the dimethylolphenol curative employed in the invention may be in accordance with conventional practice. It will be understood that such amount can vary widely in practice depending on such factors as the particular EPDM rubber employed, the particular dimethylol phenol used, the degree of cure desired, the amount and kinds of accelerators or other ingredients, the conditions of cure, etc. Usually the amount of curative used will fall within the range of from 1 to 20 parts by weight per 100 parts of EPDM rubber. However, since the present synergistic cocatalyst system is capable of rendering the action of the curative more efficient, it is possible in practicing the invention to use less curative than in conventional practice, to achieve a desired level of cure. Both the metal salt and the cocatalyst (organic halogen compound) are ordinarily used in the range of from 0.2 to 10 phr. (parts per 100 of rubber) although other quantities can be used. The ratio of metal salt to cocatalyst is usually within the range of from 0.1:1 to 10:1 (by weight), preferably in the range from 0.5:1 to 2:1, although other ratios can be used if desired. The conditions under which the cure is carried out may be as in conventional practice, and as will be understood by the skilled rubber compounders will vary widely depending on the particular formulation, the specific article being made, the character of the heating device, etc. Because of the remarkable synergistic accelerating effect made possible by the invention, a given level of cure may be achieved under less severe conditions (shorter time and/or lower tempearture) than in conventional practice. If desired, any other suitable conventional compounding ingredients may be present in the vulcanizable mixture of the invention, notably pigments or fillers such as carbon black or silica, antioxidants, processing aids, oil extenders, and the like.

The vulcanizate of the invention is suited to a wide variety of uses, among which may be mentioned curing bags, steam hose, belts, footwear, tires, inner tubes, etc.

A remarkable feature of the invention is that the cocatalyst substance used in the invention to achieve synergistic acceleration with the metal salt promoter, actually in general tend to retard or prevent cure if used in the absence of the metal salt.

EXAMPLE

The EPDM rubber employed in this example is a terpolymer of ethylene, propylene and dicyclopentadiene (E/P ratio 60/40, by weight; 10% dicyclopentadiene, Mooney viscosity 63 [ML–4 @ 212° F.] and an Iodine Number of 10).

A masterbatch is prepared from 100 parts of the EPDM rubber, 50 parts of HAF black, 10 parts of petroleum hydrocarbon oil (e.g., naphthenic coastal tall oil of API gravity 0.9001, flash point [open cup] 440° F.) and 10 parts of SP-1055, a commercial bromomethyl, alkylated, phenol-formaldehyde resin containing 3.6–3.9% bromine (see, for example, Example 2 of Braidwood 2,972,600). Using this masterbatch, the four stocks shown in the table below were prepared, and cured by heating at 331° F. for 15 minutes. The physical properties shown in the table demonstrate the remarkable acceleration in the stock of the invention (Stock D).

|  | A | B | C | D |
|---|---|---|---|---|
| Masterbatch | 170 | 170 | 170 | 170 |
| 1,2-dibromo-1,2-diphenylethane |  | 3.52 |  | 3.52 |
| $SnCl_2 \cdot 2H_2O$ |  |  | 2.25 | 2.25 |
| Tensile | 40 | 40 | 500 | 1,490 |
| Elongation | 190 | 170 | 490 | 390 |
| M-200 |  |  | 225 | 520 |
| M-300 |  |  | 330 | 1,040 |
| Hardness | 25 | 25 | 43 | 51 |
| Mooney scorch at 275° F.: |  |  |  |  |
| 1 point rise | >30 | >30 | 1 | 1 |
| 2 point rise |  |  | 2 | 2 |
| 10 point rise |  |  | 3 | 9 |

This example may be repeated using a non-brominated resin, e.g., SP-1045, a commercial 2,6-dimethylol-4-octyl phenol resin.

The example may be repeated, using any of the other co-catalyst substances disclosed above, such as 1,4-dibromo-1,2,3,4-tetrahydronaphthalene, 1,3-dibromoindane, 1,2,4,5 - tetrabromo - 1,5 - diphenylpentanone - 3,1,2 - dibromo - 1,1 - dichloroethane, alpha - bromomethyl - 4-nitrobenzyl alcohol, 1,2 - dichloroethyl ethyl ether, beta-bromoethyl phenylether, 2,3-dihydro-5,7,8-tris(2-chloroethylthio)-6-hydroxy-1,4-benzoxathiin, 2,3,5,6 - tetrakis (2-chloroethyl-thio)-1,4-hydroquinone, and 2,3-dichlorosuccinic acid.

The example may be repeated, using EPDM rubber in which the diene is 1,4-hexadiene or ethylidene norbornene, or other non-conjugated diene, in place of dicyclopentadiene.

Having thus described my invention, what I claim and desire to protect by Letters Patent is:

1. A vulcanizable composition comprising a mixture of
  (A) ethylene-propylene - nonconjugated diene terpolymer rubber containing ethylene and propylene in ratio from 20:80 to 75:25 by weight, the amount of said diene being from 1 to 25% by weight,
  (B) a dimethylol phenol curative for said rubber,
  (C) a metal salt activator for said curative which consists of a heavy metal halide, and
  (D) 1,2-dibromo-1,2-diphenyl ethane as a synergistically acting so-catalyst for the cure, the amount of (B) being from 1 to 20 parts, the amount of (C) being from 0.2 to 10 parts, and the amount of (D) being from 0.2 to 10 parts, per 100 parts by weight of said rubber, and the ratio of (C) to (D) being from 0.1:1 to 10:1 by weight.

2. A vulcanizable composition as in claim 1 in which (C) is stannous chloride.

3. A vulcanizable composition as in claim 1 in which (B) is selected from the group consisting of 2,6-dimethylol - 4 - alkyl phenol resin and brominated 2,6-dimethylol-4-alkyl phenol resin.

4. A vulcanizable composition as in claim 1 in which (A) is a terpolymer of ethylene, propylene, and dicyclopentadiene.

5. A method of vulcanizing the terpolymer rubber defined in claim 1 comprising subjecting to vulcanizing conditions the composition of claim 1.

6. A method as in claim 5 in which (C) is stannous chloride.

7. A method as in claim 5 in which (B) is selected from the group consisting of 2,6-dimethylol-4-alkyl phenol resin and brominated 2,6-dimethylol-4-alkyl phenol resin.

8. A vulcanizate comprising ethylene-propylene-nonconjugated diene terpolymer rubber containing ethylene and propylene in ratio of from 20:80 to 75:25 by weight, the amount of said diene being from 1 to 25% by weight, vulcanized by a dimethylol phenol curative for said rubber in the presence of a metal salt activator for said curative which consists of a heavy metal halide and 1,2-dibromo-1,2-diphenyl ethane as a synergistically acting co-catalyst for the cure, the amount of said curative being from 1 to 20 parts, the amount of said activator being from 0.2 to 10 parts, and the amount of said co-catalyst being from 0.2 to 10 parts, per 100 parts by weight of said rubber, and the ratio of activator to co-catalyst being from 0.1:1 to 10:1 by weight.

9. A vulcanizate as in claim 8 in which said activator is stannous chloride.

10. A vulcanizate as in claim 8 in which said curative is selected from the group consisting of 2,6-dimethylol-4-alkyl phenol resin and brominated 2,6-dimethylol-4-alkyl phenol resin.

11. A vulcanizate as in claim 8 in which (A) is a terpolymer of ethylene, propylene, and dicyclopentadiene.

References Cited
UNITED STATES PATENTS

| 2,726,224 | 12/1955 | Peterson et al. | 260—846 |
| 2,999,081 | 9/1961 | Stivers | 260—846 |
| 3,287,440 | 11/1966 | Giller | 260—848 |

FOREIGN PATENTS 987,827  3/1965  Great Britain.

JOHN C. BLEUTGE, Primary Examiner

U.S. Cl. X.R.
252—429; 260—846